Nov. 15, 1960 J. F. ENGELBERGER ET AL 2,960,070
POWER BOOSTER
Filed May 20, 1957 3 Sheets-Sheet 1

INVENTORS.
Joseph F. Engelberger
John F. Miles
Frederick J. Walker
By Mason, Kolehmainen, Rathburn & Wyss
Attys.

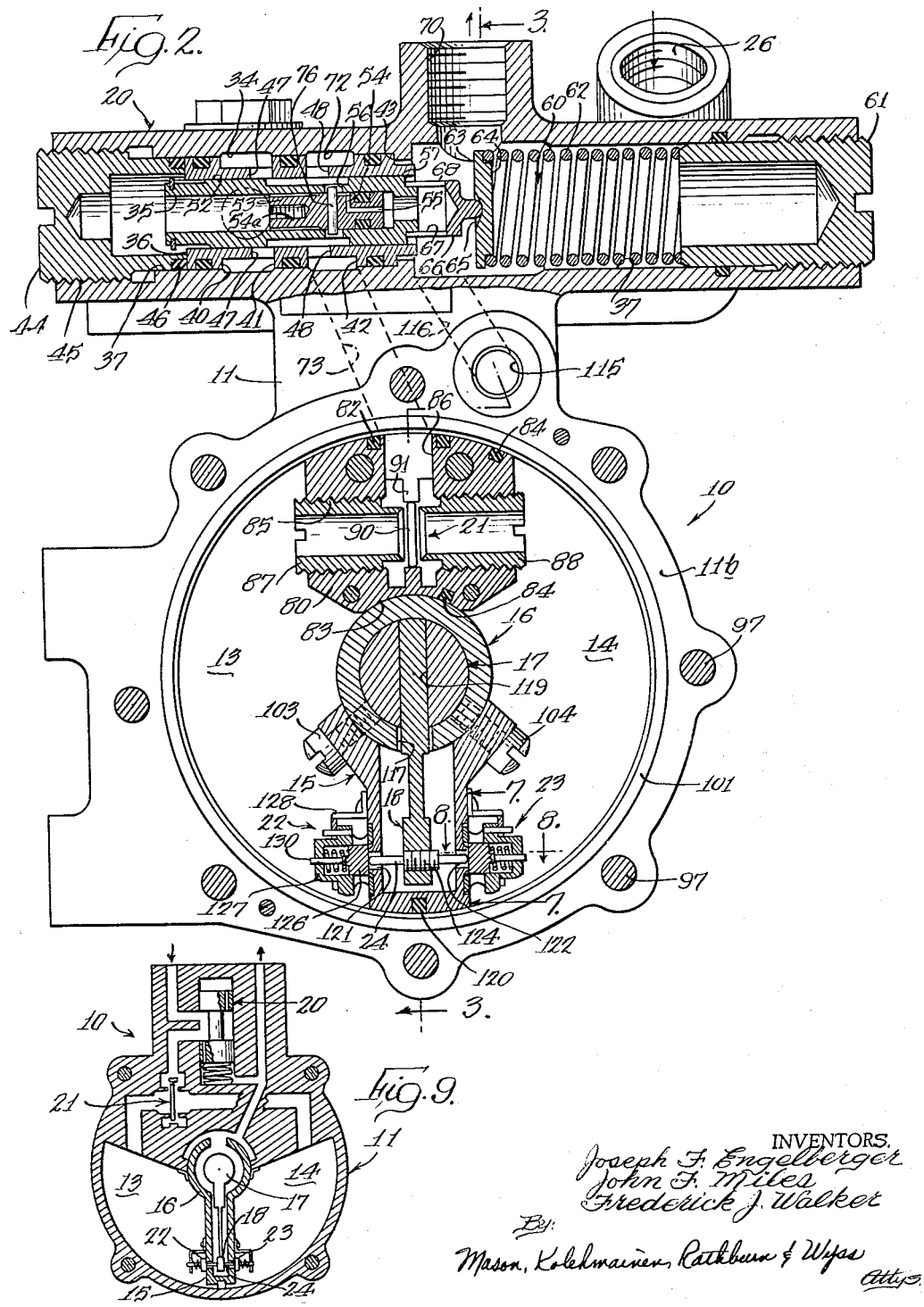

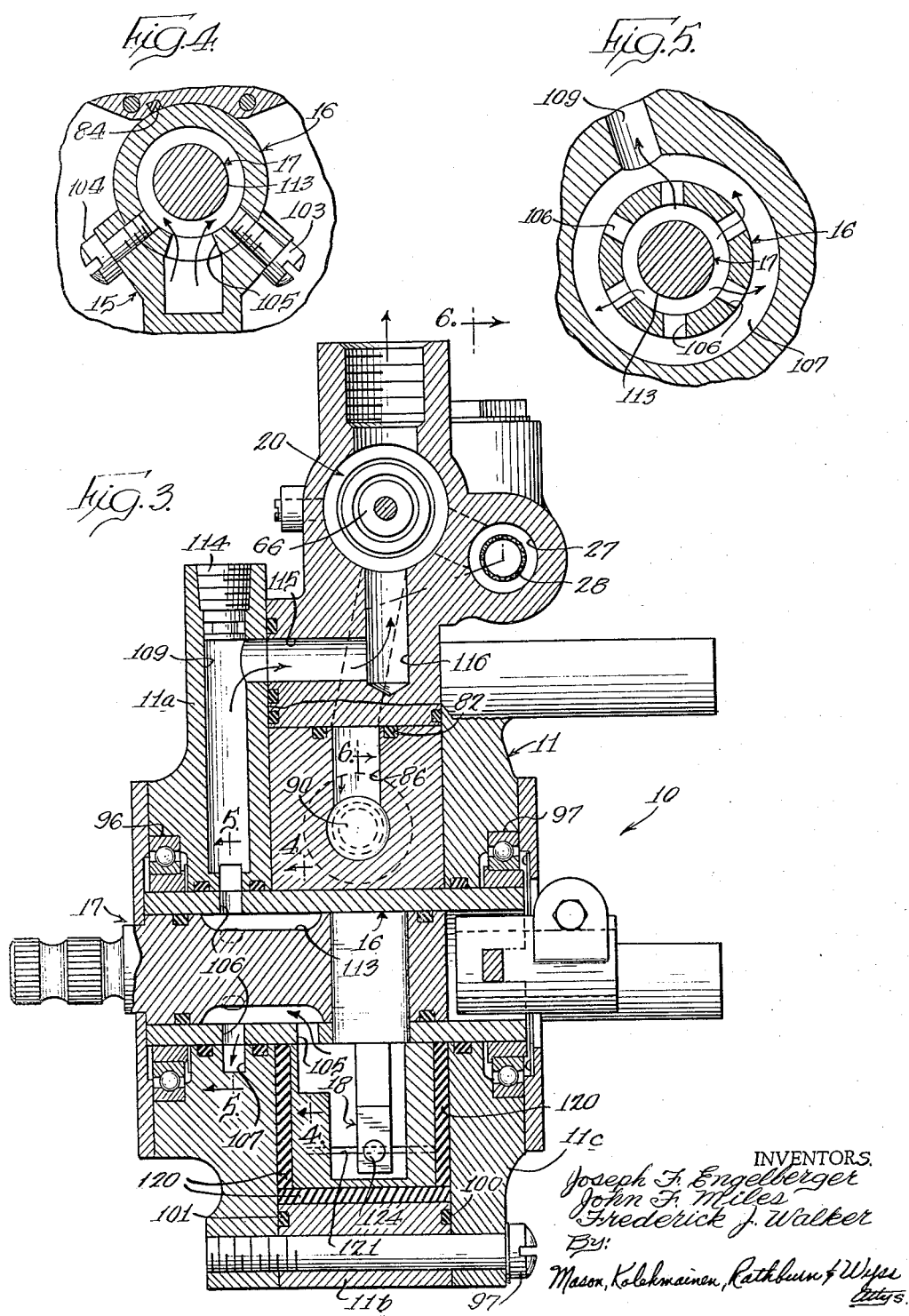

2,960,070
Patented Nov. 15, 1960

United States Patent Office

1

2,960,070

POWER BOOSTER

Joseph F. Engelberger, Newtown, John F. Miles, Sandy Hook, and Frederick J. Walker, Bethel, Conn., assignors, by mesne assignments, to Consolidated Controls Corp., a corporation of New York Filed May 20, 1957, Ser. No. 660,164

11 Claims. (Cl. 121—41)

The present invention relates to power boosters, which, by means of fluid pressure, controlled by one or more pilot valves, amplifies an input force or torque. More particularly, this invention concerns torque boosters and is described in connection with a booster for use in aircraft control applications wherein the forces on the control stick which the pilot has to overcome are sufficiently large to require an auxiliary source of power.

Power boosters are presently used in many applications, and in addition to their use in aircraft, they are, for example, widely used as the auxiliary power mechanisms in power steering apparatus for automobiles. However, the performance requirements of power boosters for use in aircraft are considerably higher than those required for other applications and, consequently, power boosters which are suitable for use in aircraft are of a higher quality than the boosters used in the other applications. For example, among other things, the following requirements must be met by a torque booster which is suitable for use in the control system of an airplane:

(1) The permissible relative movement or resolution between the input and output elements of the booster must be kept at a minimum, and preferably within one-half degree in the case of rotary control elements.

(2) The flow of fluid through the booster should be kept at a minimum and preferably there should be no flow whatsoever when the input element, i.e., the control stick is at rest.

(3) The force required to move the input element must be as small as possible.

(4) The size and weight of the booster must be small.

Therefore, a principal object of the present invention is to provide a new and improved power booster.

Another object of the present invention is to provide a new and improved power booster suitable for use in aircraft.

A further object of the present invention is to provide a new and improved torque booster meeting the above-recited requirements of a power booster for use in aircraft.

A still further object of the present invention is to provide a torque booster system for use in connection with the control stick of an airplane.

The invention, both as to its organization and method of operation, together with further objects and advantages thereof, will best be understood by reference to the following detailed description, taken in connection with the accompanying drawings, in which:

Fig. 2 is an enlarged cross-sectional view taken along the line 2—2 of Fig. 1;

Fig. 3 is a cross-sectional view taken along the line 3—3 of Fig. 2, assuming the entire structure to be shown therein;

2

Figure 1:
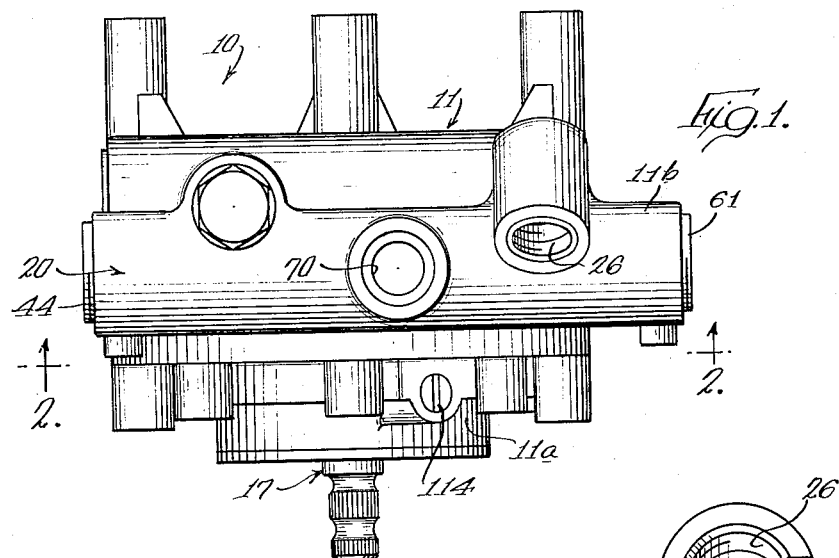
Fig. 1 is a top view of a torque booster embodying the features of the present invention.
Figure 6:
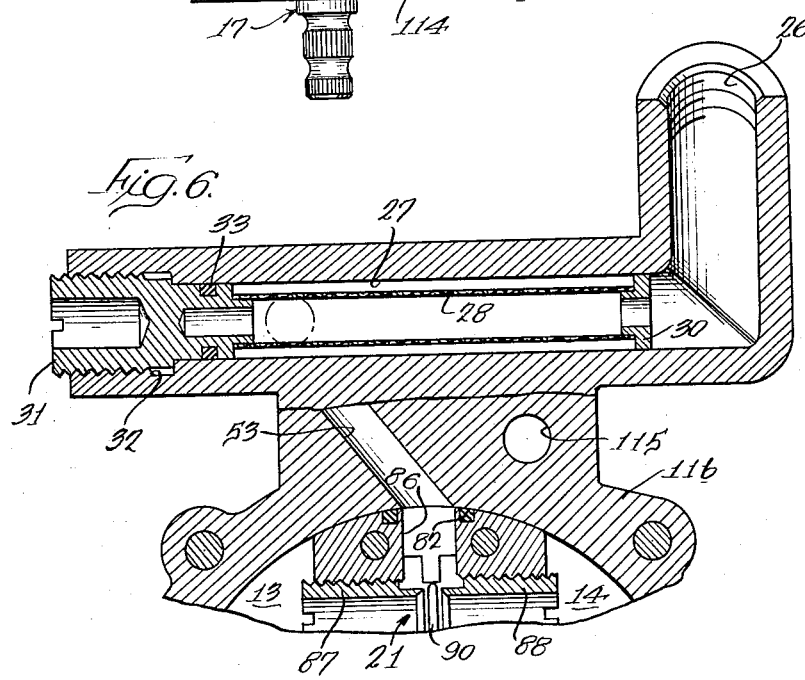
Figure 7:
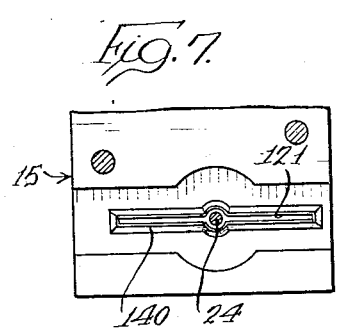
Figure 8:
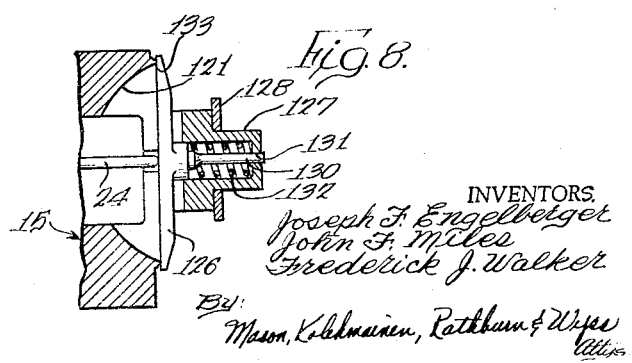

Fig. 4 is a fragmentary cross-sectional view taken along the line 4—4 of Fig. 3;

Fig. 5 is a fragmentary cross-sectional view taken along the line 5—5 of Fig. 3;

Fig. 6 is a fragmentary cross-sectional view taken along the line 6—6 of Fig. 3;

Fig. 7 is a fragmentary view of a portion of one of the orifices of Fig. 3 as viewed along line 7—7 thereof;

Fig. 8 is a fragmentary cross-sectional view taken along the line 8—8 of Fig. 3; and Fig. 9 is a diagrammatic view of the torque booster of the present invention.

Referring now to the drawings, and particularly to Fig. 9 thereof, the torque booster 10 of the present invention is therein illustrated as comprising a housing 11 defining an arcuate working chamber which is divided into two sealed chambers 13 and 14 of variable volume by means of a rotatable vane 15 which is attached to and radially extends from an output shaft 16. As is more fully described hereinafter, the shaft 16 is journaled for rotation about its principal longitudinal axis in the housing 11 and is concentric with an input shaft 17 which is journaled in the output shaft 16 and protrudes from the housing 11.

The vane 15 is hollow and a poppet valve actuating arm 18 which is attached to the input shaft 17 of the booster and extends radially therefrom is disposed within the cavity of the vane 15. High pressure fluid from a suitable source is supplied through a pressure regulating and reducing valve 20 and a bidirectional floating disc type valve 21 to both of the chambers 13 and 14. The cavity within the vane 15 is suitably vented to a point of lesser pressure than that provided at the output of the reducing valve 20 and a pair of poppet valves 22 and 23 are respectively disposed on opposite sides of the vane 15 near the outer end thereof to selectively connect the sealed chamber 13 or 14 to the cavity within the vane 15 and thus to the point of lower pressure. As shown, rotation of the arm 18 in a clockwise direction relative to the vane 15 causes an actuating pin 24 which is mounted in the arm 18 near the end thereof to open the poppet valve 22 and rotation of the arm 18 in the opposite direction causes the poppet valve 23 to be opened. The poppets 22 and 23 are spring biased to a normally closed position and the length of the pin 24 is such that when the arm 18 is centered with respect to the vane 15 both of the poppets 22 and 23 are closed.

Considering, very briefly, the operation of the torque booster 10, when the input and output shafts are in alignment, the arm 18 is centered in the vane 15 and both of the poppet valves 22 and 23 are closed. Therefore, and as more fully described hereinafter, the floating disc valve 21 connects the output from the valve 20 to both of the chambers 13 and 14. Accordingly, the pressures in the two chambers are equalized and there is no force exerted on the vane 24 to cause it to move. Assuming that the pilot now commences to rotate the input shaft 17, a small angular rotation in, for example, the clockwise direction as viewed in Fig. 9, causes the pin 24 to engage the poppet valve 22 and moves it out of engagement with its associated valve seat in the vane 15 thereby to exhaust the chamber 13 through the cavity within the vane 15 to the fuel return line. This results in an immediate pressure drop in the chamber 13 and the floating disc valve 21, which is sensitive to the differential pressure thereacross, closes the connection between the chamber 13 and the outlet from the pressure regulating valve 20 while maintaining the connection between the valve 20 and the chamber 14 open. Accordingly, the pressure differential thus produced across the vane 15 causes it to be moved in the direction to rotate the output shaft 16 in a clockwise direction. Continued rotation of the input shaft 17 in the same direction results in the vane 15 and thus the output shaft 16 following very closely the movement of the input shaft 17 and when rotation of the shaft 17 is terminated, the shaft 16 continues to follow until the valve 22 is closed by engagement of the valve seat on the vane 15 with the poppet 22 and the poppet 22 is moved out of engagement with the pin 24 on the arm 18 at which time the input and output shafts are in correspondence and both of the valves 22 and 23 are closed. A perfect seal is not provided between the vane 15 and the chamber walls so that a small amount of leakage is provided between the chambers 13 and 14. Accordingly, the pressure in the sealed chambers 13 and 14 quickly equalizes when both poppet valves 22 and 23 are closed. Consequently, the floating disc valve 21 will immediately open the connections between the regulator 20 and the chambers 13 and 14 to terminate movement of the vane 15. In the event that there is very little leakage across the vane 15, a small bleed passageway may be provided across the floating disc valve 21 to provide the necessary leakage between chambers 13 and 14 so that the pressures in these chambers are rapidly equalized when the poppet valves are closed. If the input shaft 17 is rotated in the opposite direction, it will be evident that the poppet 23 will be opened and the vane 15 moved in a similar manner so that the output shaft 16 will accurately follow movement of the input shaft 17. It will be apparent that the only fluid flow through the booster 10 occurs during movement of the shaft 16. Once such movement is terminated all fuel flow through the booster is terminated so that a relatively low capacity fuel supply is required.

Considered in greater detail, the torque booster 10 comprises a fluid inlet port 26 which is adapted to be connected to a suitable source of high pressure fluid in the airplane. Preferably the inlet port 26 is connected to an output of the fuel pump and the high pressure fuel which is used in jet aircraft is conveniently used as a fluid supply for the torque booster 10. The inlet port 26 is connected to drilled passageway 27 within which is positioned a filter assembly including a cylindrical screen 28. The screen 28 is mounted on and interposed between a shouldered washer 30 and the shoulder end of a cap 31 which is threadedly received in a threaded counterbore 32 at the end of the passageway 27 and which is sealed to the passageway 27 by means of a resilient O ring 33. It may thus be seen that the fluid which flows into the inlet duct 26 passes through the bore in the washer 30, into the cavity in the screen 28 and thence through the screen 28 to an annular inlet port 34 of the pressure regulator 20.

The regulator 20 is a conventional sleeve type pressure regulator and, as best shown in Fig. 2, comprises a valve sleeve 35 which is slidably mounted in a cylinder 36. The cylinder 36 is fixedly mounted within a bore 37 which is parallel to and offset from the inlet passageway 27 and includes a plurality of annular flanges 40, 41, and 42 which are suitably recessed to receive annular O rings which are compressed between the cylinder 36 and the wall of the bore 37. The flange 42 is held against shoulder 43 by means of a threaded cap 44 which is received in a threaded counterbore 45. An O ring 46 is compressed between the cap 44 and the bore 37 to prevent any of the fluid which may pass between the cap 44 and the cylinder 36 from leaking out of the system between the cap 44 and the counterbore 45. A plurality of inlet ports 47 are drilled in the cylinder 36 intermediate the flanges 40 and 41 and a plurality of similar outlet ports 48 are drilled in the cylinder 36 between the flanges 41 and 42.

In order to regulate the pressure of the fluid which passes to the outlet port 48 of the regulator, the sleeve 35 is provided with an annular land 52 which is adapted to be slidably moved to vary the effective area of communication between the inlet port 47 and the outlet port 48. Within the sleeve 35 there is provided a plug 53 having a pair of intersecting passageways 54 and 55 which connect the right-hand end of the plug 53 to a hole 53 to a hole 56 which is disposed in the sleeve 35 between the land 52 and a land 57 provided on the right-hand end of the sleeve 35 as viewed in Fig. 2. A spring assembly 60 is mounted in the bore 37 between a cap 61 which is threadedly received in a counterbore at the end of the bore 37 and the sleeve 35 to bias the sleeve 35 toward the cap 44. The spring assembly 60 includes a helical coil spring 62 and a disc-like cap 63 having a boss 64 which partially extends into the spring 62 and which is provided at its opposite end with a spherical recess 65 in which the rounded head of a cup-shaped cap member 66 is received. The member 66 is provided with a bore 67 and a plurality of slots 68 therein so that the passageways 54, 55 in the plug 53 connects the outlet side of the regulator 20 with a fluid outlet port 70 which is preferably connected to the return line for the fuel pump which pumps fluid into the inlet port 26.

The passageways 54, 55 thus provide a leakage port which prevents the pressure in the chambers 13 and 14 from building up to the supply pressure of the fluid at the inlet 26 which might occur due to piston leakage in the regulator 20 when the poppet valves 22 and 23 remain closed for a considerable period of time. Accordingly, these chambers need only to be designed to withstand pressures in the range of the reduced pressure provided at the outlet of the reducing valve 20 rather than the full fuel supply pressure and, consequently, this portion of the booster 10 may be of substantially less weight and size and hence the booster is particularly suited to aircraft control applications.

The outlet pressure of the regulator 20 is supplied to the left-hand side of the sleeve 35, as viewed in Fig. 2, by leakage between the plug 53 and the bore of the sleeve 35 so that the output pressure is compared with the force exerted on the sleeve 35 by the spring 62 and thereby controls the effective area of the inlet port 47 in accordance with the value of the inlet pressure thereby to maintain a constant pressure at the outlet 48. For example, if the inlet pressure increases, the pressure on the left-hand side of the sleeve 35, as viewed in Fig. 2, also increases thereby to move the sleeve 35 to the right against the force exerted thereon by the spring 62 thereby partially to close the inlet port 47 and maintain the pressure at the outlet 48 constant. It may thus be seen that fluid of a constant pressure is supplied from the outlet port 48 through an annular passageway 72 and a duct 73 to the floating disc valve 21. It will be noted that the plug 53 is provided with a threaded opening 54a in the left-hand end thereof within which opening a suitable tool may be secured to permit assembly of the plug 53 within the sleeve 35, it being understood that the plug 53 is retained within the sleeve 35 by means of a pin 76 which is inserted into the plug 53 through the opening 56 in the sleeve 35 after the plug 53 is positioned within this sleeve.

As best shown in Figs. 2 and 6, a partition member 80 is fixedly mounted in a cylindrical cavity within the housing 11 and cooperates with the vane 15 to define the chambers 13 and 14. The member 80 is shaped to conform to the adjacent walls of this cavity and the output shaft 16 and is sealed thereto by means of the gasket 82. The member 80 constitutes the body of the valve 21 and is provided with a bore 85 which is threaded at opposite ends and communicates at the center thereof with a bore 86 which is drilled at right angles to the bore 85 and which is aligned with the duct 73. A pair of tubular nozzles 87 and 88 having valve seats at the inner ends thereof are threadedly received in the opposite ends of the bore 85 and a floating disc 90 is interposed between the valve seats of the nozzles 87 and 88 and is maintained in alignment therewith by means of an annular flange 91 which is centrally disposed with respect to the valve seats of the plugs 87 and 88. The flange 91 is of the same inner diameter as the bore 85 so that the disc 90 can readily be inserted into the bore 85 before one of the nozzles 87, 88 is assembled to the member 80.

As shown, the nozzles 87 and 88 are so adjusted with respect to one another in the bore 85 that the valve disc 90 normally floats between the associated valve seats so that the sealed chambers 13 and 14 are both normally connected to the outlet of the reducing valve 20.

In accordance with the present invention and as best shown in Fig. 3, the output shaft 16 is journaled at its opposite ends in a set of ball bearings 96 and 97 the outer races of which are received in suitable annular recesses in the housing 11. The housing 11 principally comprises a plurality of interfitting portions 11a, 11b, and 11c which are secured together by means of the screws 97. The cavity within which the member 80 and vane 15 are mounted is defined by a cylindrical recess in the center member 11b, and the inner faces of the members 11a and 11c, and a pair of O rings 100 and 101 are respectively disposed between the member 11b and members 11a and 11c to seal this cavity from the atmosphere.

As best shown in Fig. 4, the vane 15 is secured to the output shaft by means of a pair of machine screws 103 and 104 and the opening within the vane 15 is disposed opposite a port 105 in the output shaft 16. As best shown in Fig. 5, the output shaft 16 is additionally provided with a plurality of radially directed ports 106 which are axially displaced from the port 105 and are disposed opposite an annular recess 107 in the housing portion 11a. The recess 107 communicates with a drilled passageway 109 in the housing member 11a. In order to connect the port 105 to the passageway 109 the inlet shaft 17 is provided with an annular recess 113 which overlaps the ports 105 and 106 in the output shaft 16. Accordingly, irrespective of the angular position of the shaft 16 in the housing 11 the opening in the vane 15 is connected to the passageway 109. The end of the passageway 109 is suitably sealed by means of a plug 114 which is threadedly received in a counterbored recess at the end of the passageway 109 and a pair of intersecting passageways 115 and 116 in the housing member 11b interconnect the passageway 109 with the bore 37 at the low pressure end of the sleeve 35. Accordingly, the opening in the vane 15 is always connected to the outlet port 70.

In accordance with a further aspect of the present invention, the torque booster of the present invention includes a safety feature wherein the pilot is able to maintain control of the aircraft in the event of an hydraulic failure. More particularly, the output shaft 16 is provided with a centrally disposed slot 117 through which the actuating arm 18 extends. The actuating arm 18 is secured within a diametric bore 119 in the input shaft 17 and the circumferential width of the slot 117 is only slightly greater than the thickness of the adjacent portion of the arm 18. With this arrangement, if the pressure in the system should fail for any reason and rotation of the input shaft 17 which opens one or the other of the poppet valves 22 or 23 does not cause the output shaft to be driven by means of the difference in fluid pressure on opposite sides of the vane 15, a slight additional rotation of the input shaft 17 causes the actuating arm 18 to engage the corresponding side of the slot 117 so that the output shaft 16 may then be directly driven by the input shaft 17, a one-to-one torque transmission ratio being provided.

In accordance with a further aspect of the present invention, and as best shown in Fig. 2, the actuating arm 18 has a reduced cross-section between the output shaft 16 and the poppet valve actuating pin 24. The cross-sectional area and length of this reduced section controls the spring rate of the actuating arm 18 and provides a snap-acting control of the poppet valves 22 and 23 so as to make it impossible for the pilot to maintain one or the other of the valves 22 and 23 slightly open. Such would be undesirable since it would result in a constant fluid flow through the torque booster even though the shafts 16 and 17 were not being moved.

The vane 15 is sealed to the housing members 11a, 11b, and 11c by means of the gasket members 120 and is provided with a pair of ports 121 and 122 on the opposite sides thereof connecting the opening in the vane 15 respectively to the sealed chambers 13 and 14. The ends of the valve actuating pin 24 are disposed within the ports 121 and 122 and the diameter of the pin 24 is substantially less than that of the ports 121 and 122 so as not to impede the flow of fluid therethrough. The pin 24 is provided with an enlarged central section 124 which is threadedly received in a suitable aperture near the end of the arm 18.

The pilot valves 22 and 23 are identical and, therefore, only the valve 22 is described in detail. This valve comprises a poppet 126 which is slidably received in a cup-shaped guide 127 (Fig. 8), the guide 127 being held in place opposite the port 121 by means of a guide bracket 128 which is suitably secured to the vane 15. A guide pin 130 on the poppet 126 slidably extends through a centrally disposed opening 131 in the top of the cap 127 and a coil spring 132 is compressed between the rear side of the poppet 126 and the inner side of the top of the cap 127 so as to bias the poppet into sealing engagement with a valve seat 133 which is formed by a raised land 140 around the port 121.

When the torque booster is employed in aircraft control applications, one of the factors which is particularly important is the so-called resolution of the device which is defined as the relative angular displacement between the input and output shafts to deliver a specified boost torque. To obtain high resolution, or as small a relative angle as possible, the pilot valves 22 and 23 are located at the largest possible radius on the vane 15 so as to obtain a maximum lift of the valve poppets with a minimum angular displacement. The flow area through the valves must be large enough to accommodate the fuel displaced by the vane 15 at a predetermined speed such, for example, as one hundred angular degrees per second, and also the leakage flow from the high pressure side of the vane to the low pressure side. On the other hand, the torque required to open the poppet valve against the pressure in the chambers 13 and 14, which is preferably in the order of one hundred and twenty pounds per square inch, should be as small as possible to keep the manual force required on the control stick to a minimum.

In accordance with a further feature of the invention, the above conflicting requirements are resolved by providing valve seats 133 which are rectangular in shape. If, for example, the radius to the poppet is 1.062 inches and the hydraulic area of the port 121 shown in Fig. 7 is .029 square inch, a moment of 3.8 inch pounds is required to lift the poppet with a regulated pressure to the chamber of 120 p.s.i. Assuming that a flow area of approximately .006 square inch is required at full speed of the vane and normal torque, and that the circumference of the port 121 shown in Fig. 7 is 1.59 inches, a valve lift of .0037 inch will be required which corresponds to an angular resolution of .2 angular degrees. Under these conditions, the spring rate of the arm 18 should preferably be approximately 900 pounds per inch, assuming a valve lift of approximately .004 inch and an hydraulic force of 3.5 pounds on the valve poppet. In this connection, it will be understood that the valve ports may have other configurations, such as the ball valves shown diagrammatically in Fig. 9, but such arrangements will require substantially greater input torque for the same resolution. For example, with a round valve seat and the same flow area and resolution requirements as above, a moment of approximately 26 inch pounds would be required to lift the valve poppet.

It will be noted that with the arrangement of the present invention the flow area need not accommodate any additional flow from the pressure supply since the floating disc 90 immediately seals off the supply pressure from the chamber which is connected to the return line upon opening of the corresponding poppet. Since the disc 90 is not biased to its neutral position by any springs or other biasing means, it requires very little force to be moved into or out of engagement with its associated valve seats so that the disc 90 is extremely sensitive to changes in pressure thereacross and hence moves very quickly to connect or disconnect one of the chambers from the supply line upon closing or opening of the corresponding poppet valve.

While many advantageous features of the torque booster 10 will be apparent to those skilled in the art, certain of the more important features are as follows:

(1) There is no fuel flow through the unit when the input and output shafts are at rest.

(2) When one of the discharge poppets opens, the flow from the supply line to this poppet is automatically stopped by the floating disc arrangement thereby reducing the poppet lift and consequently increasing the resolution.

(3) The hollow vane serves as a return passage, thereby permitting the poppet valves to be located further away from the input shaft with a resulting increase in resolution.

(4) Snap-action of the valve actuating arm is provided to insure against constant flow while the system is at rest.

(5) The use of poppet valves as the pilot valves instead of sliding valves with lapped fits provides a system which is much less sensitive to dirt in the hydraulic fluid.

While a particular embodiment of the invention has been shown, it will be understood, of course, that it is not desired that the invention be limited thereto since modifications may be made, and it is, therefore, contemplated by the appended claims to cover any such modifications as fall within the true spirit and scope of the invention.

Having thus described the invention, what is claimed and desired to be secured by Letters Patent is:

1. A torque booster comprising an arcuate working chamber, a vane rotatably mounted and disposed in said chamber, means for effecting a seal between said vane and the walls of said chamber whereby said vane divides said working chamber into two sealed chambers, means respectively connecting said sealed chambers to a source of pressurized fluid, a cavity in said vane, an input shaft having an arm disposed within said cavity, valve means mounted on said vane for respectively connecting said cavity with said sealed chambers in response to actuation thereof by relative movement between said arm and said vane, an output shaft connected to said vane and concentric with the axis of rotation of said vane and said input shaft, and an outlet connecting said cavity to a point of lower pressure than that of said source of fluid.

2. A torque booster comprising an arcuate working chamber, tubular output shaft disposed within said chamber and journalled for rotation about the central axis of said chamber, a hollow vane mounted on and sealed to said output shaft, the outer end of said vane being slidably sealed to the walls of said chamber thereby to divide said chamber into two sealed chambers, an inlet shaft concentric with said output shaft and at least partially received therein, means for connecting a source of high pressure fluid to each of said sealed chambers, first and second normally closed valves mounted on said vane near the outer end thereof and respectively connecting said sealed chambers to the cavity in said vane, a passageway connecting said cavity to a point of lower pressure than that of said source, an aperture in said output shaft opening into said cavity, and a valve actuating arm mounted on said input shaft and extending through said aperture into said cavity, said arm having valve actuating portions which are respectively disposed adjacent said valves for opening one of said valves in response to relative displacement of said input and output shafts in one angular direction and for opening the other of said valves in response to relative displacement of said shafts in the opposite angular direction.

3. A torque booster comprising a tubular output shaft and an input shaft concentrically disposed in said output shaft, fluid operated means for rotating said output shaft in response to the selective operation of a plurality of valves, an arm on said input shaft extending through a circumferential slot in said output shaft for operating said valves, the circumferential length of said slot being slightly greater than that required to permit said arm to be moved to the valve opening positions, whereby said output shaft may be directly driven by said input shaft.

4. A torque booster as set forth in claim 3 wherein said fluid operated means includes a hollow vane on which said valves are mounted, said vanes being mounted on said output shaft, and said arm is disposed within said vane.

5. A torque booster comprising a housing having a sealed chamber therein, a rotatably mounted vane disposed in said chamber and dividing it into two separate chambers, an output shaft connected to said vane, means for connecting a source of pressurized fluid to each of said separate chambers, an input shaft rotatably mounted in said housing and concentric with said output shaft, and valve means responsive to relative angular displacement of said shafts for selectively exhausting said separate chambers, said valve means being carried by said rotatably mounted vane and being offset from the axis of said input and output shafts.

6. A power booster comprising a working chamber, an output member relatively movable in said chamber and dividing said chamber into two sealed chambers, pressure sensitive valve means independent of said output member and connected between a source of pressurized fluid and each of said sealed chambers for selectively disconnecting said sealed chambers from said source only when the pressure of said source exceeds the pressure within said sealed chambers by at least a predetermined amount, and valve means responsive to relative movement between an input member and said output member for selectively exhausting said sealed chambers.

7. A power booster as set forth in claim 6 wherein said pressure sensitive valve means comprises a floating valve selectively movable into sealing engagement with a pair of valve seats respectively surrounding inlet ports to said sealed chambers.

8. A torque booster comprising a housing having an arcuate chamber therein, a vane rotatably mounted in said housing for dividing said arcuate chamber into two sealed chambers, pressure sensitive valve means independent of said vane means and connected between a source of pressurized fluid and each of said sealed chambers for selectively disconnecting said sealed chambers from said source only when the pressure of said source bears a predetermined relationship to the pressure within said sealed chambers, and valve means responsive to relative rotation between an input member and said vane for selectively connecting said sealed chambers to an area having a pressure which is substantially less than that of said source.

9. A power booster comprising a working chamber, an output member relatively movable in said chamber for dividing said chamber into two sealed chambers, means connecting said sealed chambers to a source of pressurized fluid, valve means for selectively venting said chambers, and valve actuating means including a spring for opening said valve means.

10. A power booster as set forth in claim 9 wherein said spring has a predetermined spring rate to prevent said valve means from being held cracked open by said valve actuating means.

11. A torque booster comprising a housing having an arcuate chamber therein, a vane rotatably mounted in said housing and dividing said arcuate chamber into two separate chambers, means for supplying pressurized fluid to each of said separate chambers, and valve means including a pair of poppet valves mounted on said vane and respectively connecting said separate chambers to an exhaust point, the valve members and the valve seats of said poppet valves being rectangular to provide a high degree of resolution and low operating torque.

References Cited in the file of this patent

UNITED STATES PATENTS

| | | |
|---|---|---|
| 913,853 | Rowntree | Mar. 2, 1909 |
| 1,036,711 | Rainalter | Aug. 27, 1912 |
| 1,112,495 | Turner | Oct. 6, 1914 |
| 1,178,695 | Yost | Apr. 11, 1916 |
| 1,609,641 | Christensen | Dec. 7, 1926 |
| 1,876,104 | Tucker | Sept. 6, 1932 |
| 2,465,761 | Staude | Mar. 29, 1949 |
| 2,481,426 | Hull | Sept. 6, 1949 |
| 2,524,682 | Staude | Oct. 3, 1950 |
| 2,579,711 | Staude | Dec. 25, 1951 |

FOREIGN PATENTS

| | | |
|---|---|---|
| 295,290 | Great Britain | Oct. 31, 1929 |